A. T. DUDLEY.
TWISTING DEVICE.
APPLICATION FILED SEPT. 12, 1914.
1,257,465.
Patented Feb. 26, 1918.
2 SHEETS—SHEET 1.
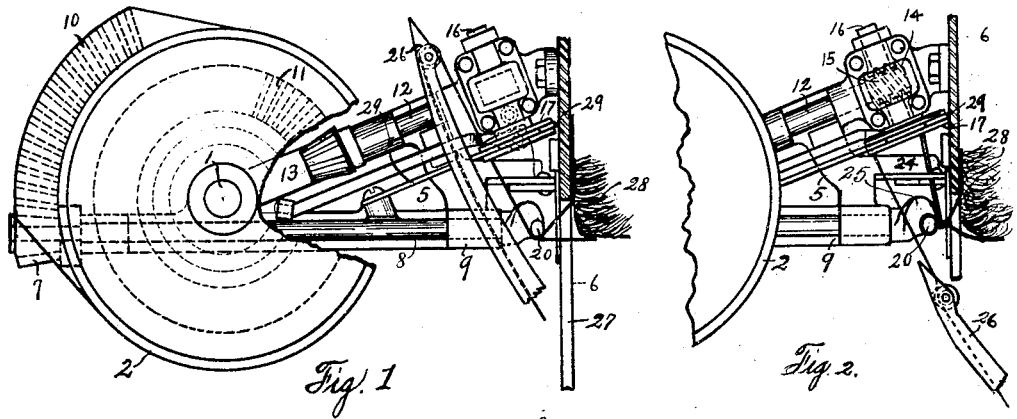
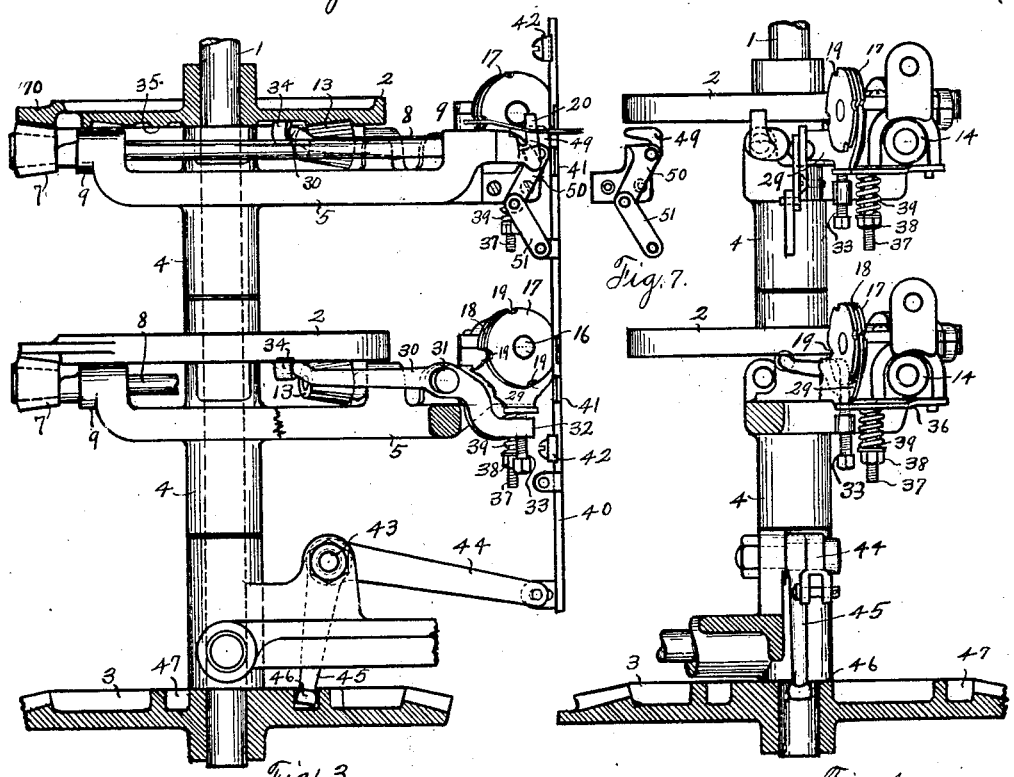
WITNESSES:
INVENTOR
Andrew Tilson Dudley
BY
Hardway & Cathey
ATTORNEYS

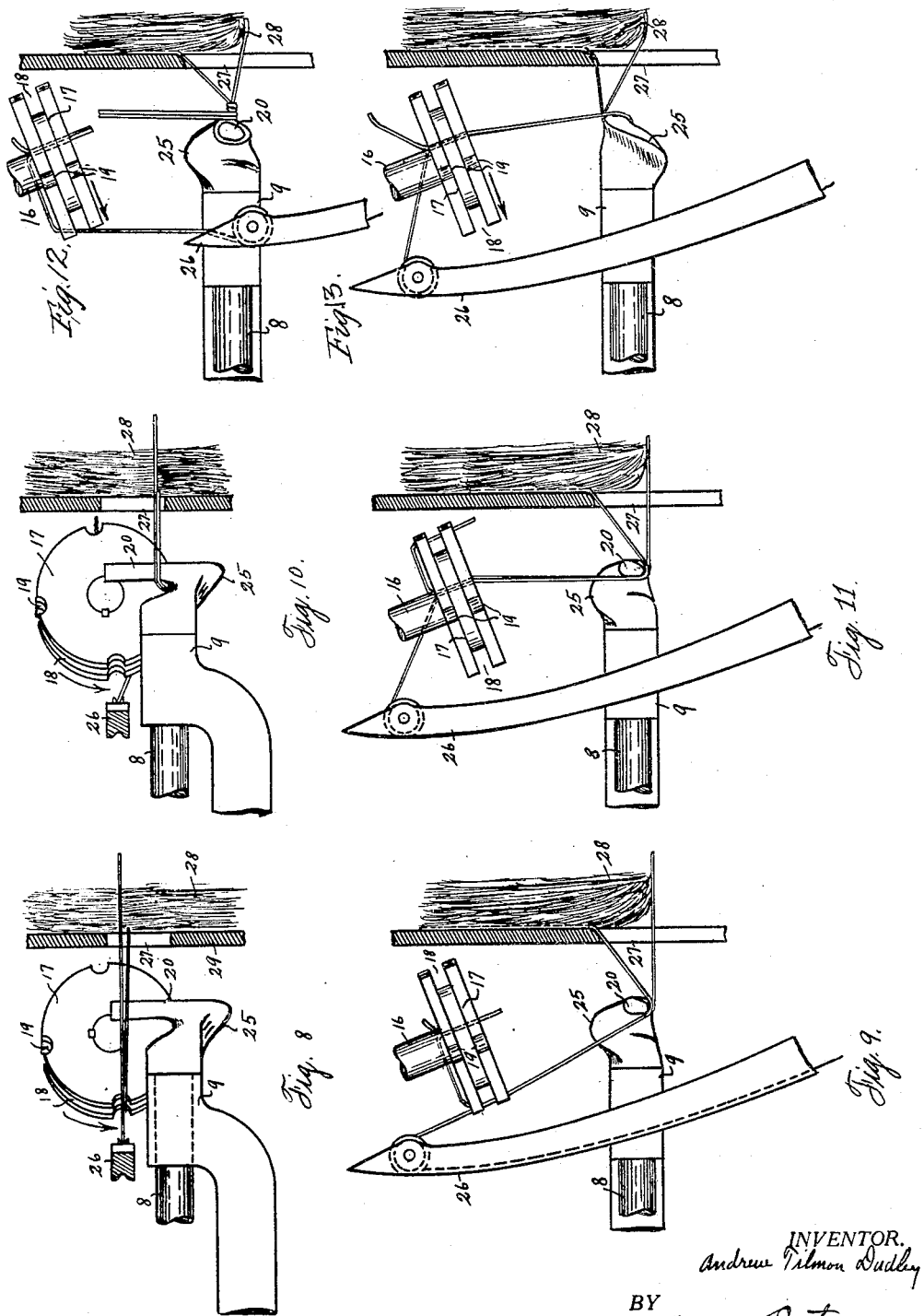

UNITED STATES PATENT OFFICE.

ANDREW TILMON DUDLEY, OF HOUSTON HEIGHTS, TEXAS, ASSIGNOR OF ONE-TWENTIETH TO J. H. MITCHELL, OF HOUSTON, TEXAS.

TWISTING DEVICE.

1,257,465.   Specification of Letters Patent.   Patented Feb. 26, 1918.

Application filed September 12, 1914. Serial No. 861,430.

*To all whom it may concern:*

Be it known that I, ANDREW TILMON DUDLEY, a citizen of the United States, residing at Houston Heights, in the county of Harris and State of Texas, have invented certain new and useful Improvements in Twisting Devices, of which the following is a specification.

This invention relates to new and useful improvements in twisting devices, and has more particular relation to such devices as are adapted to be used in connection with bale forming presses wherein bales are formed and automatically tied.

This device, however, may be used in connection with any form of binding machine, but has been specially designed for securing wire around bales such as bales of hay.

The object of the invention is to provide a device of the character described, which is so constructed that it will readily twist wire or other similar tying cords into a knot so as to secure the same around a bale.

A further object of the invention is to provide means for efficiently securing the wire against slippage in the disk, while the bale is forming, but which, at the proper time, will sufficiently release the tension against the wire in said disk so as to permit the required amount of movement of the wire in said disk as the disk rotates to carry the wire around the twister hook.

A further object of the invention is to provide means for efficiently stripping the wire from the hook after it has been twisted into a knot.

With the above and other objects in view, the invention has particular relation to certain novel features of construction, operation and arrangement of parts, an example of which is given in this specification and illustrated in the accompanying drawings, wherein:—

Figures 1 and 2 show plan views of the twisting mechanism and co-acting parts, as viewed from above and showing the driving gear wheel partially broken away.

Figs. 3 and 4, respectively, show sectional side views of a pair of twisters, as viewed from different angles, certain parts being removed for the sake of clearness.

Figs. 5 and 6 show plan and end views, respectively, of the stripper plane, and

Fig. 7 shows a side view of wire cutter.

Figs. 8 and 10 are elevations and Figs. 9, 11, 12 and 13 are plan views of the wire twisting and holding mechanism shown in different operative positions.

Referring now more particularly to the drawings, wherein like numerals of reference designate similar parts in each of the figures, the numeral 1 refers to the drive shaft upon which the disks 2, 2, and also the bevel gear 3 are rigidly mounted. There are two twisters operated by this shaft, as shown, and the disks 2, 2 are identical in function and structure and are provided to drive the twister mechanism from the shaft 1. The shaft 1 operates in suitable bearings 4, 4 carried by the frame 5, which frame in turn may be secured to the wall 6 of the baling press. The numeral 7 refers to a bevel pinion, which is rigidly mounted on the outer end of the transverse shaft 8, which is rotatably mounted in the bearings 9, carried by the frame. One side of the driving disk 2 carries an outwardly projecting arcuate flange 10, whose under face has bevel gear teeth, which mesh with the gear teeth of the bevel pinion 7, as the drive disk 2 rotates. This arcuate gear face is of sufficient length to cause two complete rotations of the bevel pinion 7, with each rotation of the drive disk 2. The face of the drive disk 2 is also provided with a bevel gear section 11, arranged in advance of the flange 10, the purpose of which will be hereinafter set forth.

A short transverse shaft 12 is provided, which is rotatably mounted in suitable bearings carried by the twister frame, one end of which carries the rigidly mounted pinion 13, which meshes with the bevel gear section 11, and the other end of the shaft 12 carries a worm gear 14, which meshes with and drives a corresponding worm gear 15 rigidly mounted on the shaft 16.

The shafts 8 and 12 are in approximately parallel relation and the shaft 16 is arranged above and at right angles to the shaft 12 and fixed upon the inner end of said shaft 16 is the wire guiding disk 17, which has the peripheral groove 18 therearound, and which is provided with the peripheral notches 19, arranged at a uniform distance around its periphery, said notches being provided to engage with and carry the wires partially around the twister hook 20, which is fixed to the inner end of the shaft 8 and which rotates as said shaft turns and twists the wire into a knot as shown in Fig. 2. The free end of the wire is held securely in the guiding disk by means of a tension mechanism, presently to be described, said mechanism constituting one of the chief points of improvement embodied in the device herein shown and described, and said wire passes from said disk across the hook 20 and around the bale and then through the eye of the needle 26 and onto the spool (not shown) from which the same is unwound. When the bale has been completed, the needle is automatically driven through the slot 27 of the bale chamber, and carries the wire completely around the bale 28 and across the hook 20 and into position to be engaged by one of the notches 19 of the guiding disk 17. The needle is shown in this position in Fig. 1, although shown partially broken away to avoid confusion of this view. When the needle is in this position, the bevel gear section 11, will have been carried around to position to mesh with the pinion 13 and said pinion will thereby be caused to perform a complete rotation, causing a partial rotation of the disk 17, which will carry the tying wire closely against the twister hook 20, and form a loop of the wire around the hook.

The numeral 29 refers to a tension plate, one end of which is secured to the frame and the free end of which is arcuate and rests in the peripheral groove 18 of the disk 17 and is arranged underneath said disk. This tension plate is provided to secure the wire positively against movement in the disk 17, while said disk is idle but to hold yieldingly against said wire and permit a certain amount of slippage thereof in the disk when the disk turns, so as to avoid breaking the wire.

A lever 30, is provided, which is pivoted to the twister frame at an intermediate point 31. One end of this lever is enlarged and formed into a bearing 32, which is interiorly threaded and receives the exteriorly threaded shaft 33. The opposite end of the lever 30 has a roller bearing 34 which rests against the under face of the disk 2 and is in the path of the arcuate cam 35 carried by the under side of said disk. As before stated, this cam 35 does not extend entirely around the disk, but is merely arcuate in form. When the cam 35 contacts with the roller bearing 34, the corresponding end of the lever 30 is depressed and the opposite end elevated and exerts an upward pressure against the arcuate end of the pressure plate, thereby positively holding said plate against the wires in the twister disk and thus gripping said wires. The amount of the pressure of the plate 29 against the wires in the disk may be regulated by turning the shaft 33 and thus adjusting it in its bearing as is obvious. When the cam 35 has passed the roller bearing 34 it is obvious that the pressure of the plate 29 against the wires in the disk will be released. The cam 35 is so positioned, relative to the roller bearing 34, as to release the tension on the wires in the disk as said disk rotates, so as to permit the requisite amount of slippage of the wires in the disk, as the disk turns, but at other times said tension plate holds said wires firmly in said disk.

A bar 36 is provided, one end of which is secured to the frame 5, and the other end of which is interposed between the upper end of the shaft 33 and the pressure plate 29. This bar has a limited amount of vertical movement. A stud 37 is secured to the frame and extends through a central orifice in the bar 36 and the outer end of this stud is threaded and has the nut 38 thereon and interposed between this nut and said bar is a coil spring 39, which operates to hold the tension plate 29 yieldingly against the wire in the disk 17, when said plate is not influenced by the cam 35.

The numeral 40 refers to a stripper bar which is provided with the stripper arms 41, 41 extending laterally therefrom. The stripper bar slides vertically in the bearings 42, 42, which are fixed to the wall 6. A bell crank is provided which is pivoted to said frame at the point 43 and the free end of one of its arms 44 is pivoted to the lower end of the stripper bar. The free end of its other arm 45 has a roller bearing 46 which plays in the cam shaped groove 47 in the upper face of the bevel gear 3. As shown in Fig. 3 the stripper bar is in neutral position, that is, in the position it will occupy when the needles 26 insert the wires into the disk 17, said needles passing over the arms 41, 41 and between said respective arms and the lugs 48, 48, which project out laterally from the stripper bar parallel to the arms 41, 41. As the gear wheel continues to rotate, after the insertion of the wires, as hereinbefore stated, the free end of the arm 45 is first forced inwardly toward the center of the gear wheel 3 thereby causing a downward movement of the bar 40, and the lugs 48, 48 operate to hold the wires on the respective hooks 20, 20, while said hooks are rotating and twisting said wires into knots. The side of each hook toward the disk 17 has a cam 25 which forces the wire closely into an angle of said hook and holds it there as the hook rotates to insure the twisting of the loop of wire. As the rotation of the wheel 3 continues the free end of the arm 45 is forced outwardly and the stripper bar is driven in the opposite direction, the arms 41, 41 engaging against the wires and stripping the knots from the respective hooks 20, 20. This reciprocating movement is imparted to the stripper bar from the cam, carried on the upper face of the gear wheel 3, through the bell crank referred to above.

Between the respective twister hooks 20, 20 and the disks 17, 17, are the stationary blades 49, 49 which are fixed to the twister frame and co-acting with said fixed blades are the pivoted blades 50, 50, said fixed and pivoted blades forming shears or cutters for severing the wires after the knot has been formed. Each of the pivoted blades is extended forming actuating arms to the free ends of which the respective links 51, 51, are pivoted. The other ends of these links are pivoted to the stripper bar 40. These cutters are so located that as the disks 17 rotate the wires will be carried between their blades and as the stripper bar moves upwardly the pivoted blades 50, 50 will be actuated by it through the links 51, 51 to sever the wires just before the knots are stripped from the hooks 20, 20 by the stripper arms 41, 41.

What I claim is:—

1. A device of the character described, including a twister hook, a disk adjacent said hook, means for passing a wire across said hook and into engagement with said disk whereby the wire is held taut, and mechanism in operative connection with said hook and imparting a plurality of rotations thereto after the wire has been looped around the hook an increased amount by the disk.

2. A twister for wire and the like, including a twister hook, a disk alongside the hook for engaging with the wire to be twisted and looping the same around the hook, a mechanism for intermittently imparting a plurality of rotations to the hook and twisting said loop and a means in operative connection with said disk which intermittently imparts partial rotation thereto, intervening the successive rotations of the hook.

3. A twister for wire and other similar cords, including a twister hook, a means for intermittently imparting series of rotations thereto, a disk alongside the hook engaging with the wire to be twisted, a means in operative connection with the disk and intermittently imparting partial rotations thereto intervening the series of hook rotations, each partial rotation of the disk operating to loop the wire around the hook, the rotation of the hook operating to twist said loop.

4. A wire twisting device, including a twister hook, a means for rotating the same, a disk alongside the hook having a peripheral groove and a plurality of transverse peripheral notches, spaced apart therearound, in which the wire to be twisted engages, a tension plate, the free end of which is arcuate and rests in said peripheral groove and against the wire engaged in said disk, a means for holding said tension plate yieldingly in said groove, and a mechanism which at times holds said tension plate unyieldingly in said groove.

5. A twister for wire and other similar cords, including a twister hook, a disk alongside the hook provided to engage with the wire to be twisted and loop the same around said hook, a mechanism for rotating said hook and twisting said loop; a stripper bar, means projecting laterally therefrom, and a mechanism for actuating said bar whereby said means is engaged against said loop and the loop is stripped from said hook.

6. A twister for wire and other similar cords, including a twister hook, a disk adjacent the hook provided to engage with the wire to be twisted and loop the same around said hook, a mechanism for imparting partial rotations to said disk intermittently and twisting said loop, a mechanism for rotating the twister hook intervening the partial rotations of the disk, and a means for actuating against the loop twisted around the hook and stripping the said loop from said hook.

7. A twister for wire and other similar cords, including a twister hook, a disk alongside the hook for engaging with the wire to be twisted, a means for imparting partial rotations to the disk intermittently, whereby the wire is looped around the hook, means for rotating said hook and twisting said loop into a knot, a stripper bar, engaging means projecting laterally therefrom, and a mechanism for reciprocating said means whereby said bar engages against the wire and strips the loop from said hook.

8. A twister for wire and other similar cords, including a twister hook, a disk alongside the hook provided to engage with the wire to be twisted and loop the same around said hook, a mechanism for rotating said hook after the loop has been formed therearound and twisting said loop, a means for stripping the loop from the hook, a cutter interposed between the hook and disk, a common means actuating the cutter against said wire after the knot has been formed for severing the same, and also actuating said means to strip the loop from said hook.

9. A twister for wire and other similar cords, including a twister hook, a disk alongside the hook provided to engage with the wire to be twisted and loop the same around said hook, a mechanism for rotating the hook and twisting said loop into a knot therearound, a cutting device, including a fixed and a pivoted blade arranged between the hook and disk and between which blades the wire is carried by the disk, and a mechanism for operating the pivoted blade against the wire whereby the wire is severed.

10. A device of the character described, including a twister hook, a disk alongside the hook, provided to engage with the wire to be twisted and loop the same around said hook, a mechanism in operative connection with said hook and imparting a plurality of rotations thereto after the wire has been looped by said disk around the hook and a cam carried by the hook provided to operate against the wire and force it into an angle of the hook as the hook rotates.

11. In a device of the character described, the combination of a twister hook, means associated with the twister hook for gripping the wire and looping the same around the hook, means for rotating the hook for twisting the loop, and means for loosening the grip on the wire of said gripping means when the hook is being rotated.

In testimony whereof I have signed my name to this specification in the presence of two subscribing witnesses.

ANDREW TILMON DUDLEY.

Witnesses:
F. R. RISDON,
E. CONNOLLY.

Copies of this patent may be obtained for five cents each, by addressing the "Commissioner of Patents, Washington, D. C."